US008127251B2

(12) United States Patent
Fein et al.

(10) Patent No.: US 8,127,251 B2
(45) Date of Patent: Feb. 28, 2012

(54) METHOD AND APPARATUS FOR A USER INTERFACE WITH PRIORITY DATA

(75) Inventors: Gene S. Fein, Lenox, MA (US);
Edward Merritt, Lenox, MA (US)

(73) Assignee: Fimed Properties AG Limited Liability Company, Wilmington, DE (US)

( * ) Notice: Subject to any disclaimer, the term of this patent is extended or adjusted under 35 U.S.C. 154(b) by 1060 days.

(21) Appl. No.: 11/932,372

(22) Filed: Oct. 31, 2007

(65) Prior Publication Data

US 2009/0113348 A1   Apr. 30, 2009

(51) Int. Cl.
*G06F 3/048* (2006.01)
(52) U.S. Cl. .................................. 715/848; 715/852
(58) Field of Classification Search .................. 715/710, 715/780, 789, 811, 816, 852
See application file for complete search history.

(56) References Cited

U.S. PATENT DOCUMENTS

| | | | |
|---|---|---|---|
| 4,593,967 A | 6/1986 | Haugen | |
| 4,818,048 A | 4/1989 | Moss | |
| 5,675,437 A | 10/1997 | Hart et al. | |
| 5,812,292 A * | 9/1998 | Garcia | 708/816 |
| 6,031,519 A | 2/2000 | O'Brien | |
| 6,147,773 A | 11/2000 | Taylor et al. | |
| 6,243,054 B1 | 6/2001 | DeLuca | |
| 6,377,238 B1 * | 4/2002 | McPheters | 345/156 |
| 6,388,657 B1 | 5/2002 | Natoli | |
| 6,507,353 B1 * | 1/2003 | Huard et al. | 715/863 |
| 6,650,318 B1 * | 11/2003 | Arnon | 345/168 |
| 6,667,751 B1 * | 12/2003 | Wynn et al. | 715/833 |
| 7,054,045 B2 | 5/2006 | McPheters et al. | |
| 7,084,857 B2 | 8/2006 | Lieberman et al. | |
| 7,185,271 B2 | 2/2007 | Lee et al. | |
| 7,262,783 B2 | 8/2007 | Kramer et al. | |
| 7,312,786 B2 | 12/2007 | Anderson et al. | |
| 7,336,263 B2 | 2/2008 | Valikangas | |
| 7,634,741 B2 * | 12/2009 | Klein | 715/811 |
| 7,844,599 B2 * | 11/2010 | Kasperski et al. | 707/713 |
| 2002/0070921 A1 | 6/2002 | Feldman | |
| 2002/0075240 A1 | 6/2002 | Lieberman | |
| 2004/0095315 A1 | 5/2004 | Montellese | |
| 2004/0106090 A1 * | 6/2004 | Higgins et al. | 434/118 |
| 2004/0119746 A1 | 6/2004 | Mizrah | |

(Continued)

OTHER PUBLICATIONS

Final Office Action for U.S. Appl. No. 11/928,235, mailed on Oct. 11, 2011.

(Continued)

*Primary Examiner* — Omar Abdul-Ali
(74) *Attorney, Agent, or Firm* — Schwabe, Williamson & Wyatt, P.C.

(57) ABSTRACT

A system and corresponding method for providing a 3-dimensional (3-D) user interface displays images in a 3-D coordinate system. The method includes receiving user data input information. The method also compares the user data input information to frequently used terms and generates priority information based on the comparison. The generated priority information is displayed as holographic images in a 3-D coordinate system. Sensors are configured to sense user interaction within the 3-D coordinate system, so that a processor may receive user interaction information including the selected priority information from the sensors. The sensors are able to provide information to the processor that enables the processor to correlate user interaction with images in the 3-D coordinate system. The system may be used for interconnecting or communicating between two or more components connected to an interconnection medium (e.g., a bus) within a single computer or digital data processing system.

26 Claims, 6 Drawing Sheets

U.S. PATENT DOCUMENTS

| | | |
|---|---|---|
| 2004/0193441 A1 | 9/2004 | Altieri |
| 2005/0140660 A1 | 6/2005 | Valikangas |
| 2005/0277467 A1* | 12/2005 | Karabin et al. ............... 463/31 |
| 2005/0289472 A1 | 12/2005 | Morita et al. |
| 2006/0098089 A1 | 5/2006 | Sofer |
| 2006/0167971 A1 | 7/2006 | Breiner |
| 2006/0229108 A1 | 10/2006 | Cehelnik |
| 2007/0130128 A1* | 6/2007 | Garg et al. ..................... 707/3 |
| 2007/0169066 A1 | 7/2007 | Nielson |
| 2007/0183012 A1 | 8/2007 | Cadet et al. |
| 2007/0211023 A1 | 9/2007 | Boillot |
| 2007/0266428 A1 | 11/2007 | Downes et al. |
| 2009/0102603 A1 | 4/2009 | Fein et al. |
| 2009/0109174 A1 | 4/2009 | Fein et al. |
| 2009/0109175 A1 | 4/2009 | Fein et al. |
| 2009/0109176 A1 | 4/2009 | Fein et al. |
| 2009/0109215 A1 | 4/2009 | Fein et al. |
| 2009/0267895 A1 | 10/2009 | Bunch |

OTHER PUBLICATIONS

Non Final Office Action for U.S. Appl. No. 11/875,641, mailed on Sep. 29, 2011.
Non Final Office Action for U.S. Appl. No. 11/875,641, mailed Feb. 16, 2011.
Non Final Office Action for U.S. Appl. No. 11/928,235, mailed Dec. 23, 2010.
Non Final Office Action for U.S. Appl. No. 11/932,731, mailed Nov. 22, 2010.
Final Office action for U.S. Appl. No. 11/932,731, mailed Apr. 26, 2011.
Final Office Action for U.S. Appl. No. 11/875,641, mailed Jul. 19, 2011.
Non Final Office Action for U.S. Appl. No. 11/928,235, mailed Jun. 6, 2011.

* cited by examiner

METHOD AND APPARATUS FOR A USER INTERFACE WITH PRIORITY DATA

BACKGROUND OF THE INVENTION

The invention would be better understood if theoretical concepts would be explained in some detail. A hologram is a medium containing information and is nothing more than a high contrast, very fine grain, black and white photographic film. There are several different types of holograms and discussion of each type will be separately addressed below.

The first type is a transmission hologram. In order to playback a hologram, the hologram's reference beam must be shone back through the hologram at the same angle relationship as it had in construction. This where the term transmission hologram arises. Transmission merely means that the reference beam must be transmitted through the hologram in order for the image to be reconstructed. A part of the original beam goes through a glass and a part is reflected at the same angle as its incident. This allows one to bring in the reference beam from an infinite number of angles in relation to the object directed beam, thus, avoiding an inconvenience in playback of having to look directly in the reference beam as with the in-line, transmission hologram.

A transmission type hologram means that the reference beam must be transmitted through the hologram, in order to decode the interference patterns and render the reconstructed image. The light which is used for playback must be coherent or semi-coherent or the image will not be sharp. If a non-coherent source, such as a light from a common, unfiltered slide projector is used, then the hologram will diffract different wavelengths. The interference pattern or grating etched in the emulsion is not particular as to which wavelengths it bends or focuses; therefore, an unclear overlapping spectrum of colors resembling the object is produced.

A hologram will playback just as well with laser light of a different color or wavelength than the light with which it was made. However, the object will appear to be of a different size and/or distance from the plate. For example, a hologram of an object made with neon or red light will playback that object smaller or seemingly further away if a blue color laser is used. This is because the grating will bend the blue or shorter light less severely than the red with which it was made and with which it is meant to be decoded.

Another type of a hologram is plane or volume hologram. In a plane transmission hologram, the reference beam is hitting the film from the same side as the object beam. In a volume reflection hologram, the reference beam makes an arc clear around so that it hits the film from the opposite side as the modulated object beam.

The hologram can be viewed in white light or light which contains many different wavelengths. The one requisite is that the light be from a point source and be a somewhat straight line, such as a slide projector light or penlight, or the sun on a clear day. The reflection hologram can do this because in a way it acts as its own filter. In a reflection hologram the fringes are packed so closely together that they constitute layers throughout the thickness of the emulsion. The spacing between fringes remains constant. If a distance between a first fringe and a second fringe is two microns, for example, then the distance between the remaining layers of fringes will also be two microns. This distance is a function of the wavelength of light used in constructing the hologram and also the angle difference between reference and object beams. This layered affair allows the reflection hologram to absorb, or not reflect, any of the colors or wavelengths of light which are not the correct length. The wavelength which matches the fringe spacing will be reflected: the crests of the wavelengths which are too short or too long will eventually miss one of the planes and be absorbed into the darkness of the emulsion. In a reflection type hologram, the playback light or reconstruction beam comes from the same side of the hologram as the viewer. Some parts of the incident light are reflected, some are not, depending on the interference pattern. If the hologram was made correctly the result should be a visible three-dimensional image. In the transmission type hologram, the reconstruction beam must pass through the hologram and come towards the viewer from the opposite side of the hologram while in the reflection type the playback source comes from the same side of the hologram as the viewer.

Another type of a hologram is a multiplex hologram. This type of a hologram has a more common usage in today's technology. The multiplex hologram is the holographic storage of photographic information. In the first stage a series of photographs or a certain amount of motion picture footage of the subject is exposed. The number of stills or frames taken depends on how much of an angle of view of the subject is desired in the finished hologram. For example, if a 360-degree view of the subject, exposure of three frames per degree of movement around the subject is recommended (usually the camera remains stationary and the subject rotates) this will result in the exposure of 1080 frames. The film must be developed and using a laser, a series of "slit" holograms using each frame of film as a subject for each slit of holographic film must be made. The slits are usually about one millimeter wide and are packed so closely that there is no "dead space" in between. Also, the hologram is bleached so that the strips disappear. Usually a multiplex hologram yields a horizontal not a vertical parallax. This is because the camera usually moves around (or the subject moves around in front of the camera) and does not usually pass over the subject. Also, psychologically, horizontal parallax is much more desirable and the lack of horizontal parallax is much more noticeable than the lack of vertical parallax. The multiplex hologram is usually, though not always, made on flexible film coated with the same holographic emulsion as the plates. The procedure can be totally mechanical so that a machine can expose a slit hologram per each frame of footage at a very rapid pace. The advantage of this type of hologram is that it is possible to have a hologram of almost anything captured on an ordinary film without a need of an expensive, clumsy procedure. The disadvantage is that it is not truly a hologram but photographic information holographically stored.

There are several U.S. patents available, however, none of them fulfill the particular need that the present invention addresses. For example, U.S. Pat. No. 6,031,519 to O'Brien teaches a holographic direct manipulation interface comprising an apparatus for displaying a hologram, detection sensors of any movement relative to the hologram and a processing means for covering a location of a detected object directly relative to its position on the displayed hologram into an output signal.

A graphical user interface (GUI) is a type of computer application user interface that allows people to interact with a computer and computer-controlled devices. A GUI typically employs graphical icons, visual indicators or special graphical elements, along with text, labels or text navigation to represent the information and actions available to a user. The actions are usually performed through direct manipulation of the graphical elements.

Holographic images can be created as single or consecutive images using available holographic technology. These technologies include mirrors, lasers, light and images strategically positioned to cause the proper reflection to yield a holographic image broadcast through an entry point in the laser and mirror positioning system. Black background and rooms with low or no light may enhance the appearance of the holographic image or images, which may also use a holographic plate as a display medium. Holographic systems may be large in size and spread out over a large broadcasting area or may be compact enough to fit in spaces smaller than a desk top. Holographic technology is only limited in size by the size of the component parts. By using holographic technology, images may be displayed multi-dimensionally rather simply on a planar projection.

Currently, progress has been made in technologies that can enhance the capability and range of holographic media in projects that employ multi-million mirror systems and via companies that have designed specialized high speed and high capacity microprocessors for specialized jobs, other than holographic systems, where the technology could be applied to holographic technologies to make possible the proper positioning of millions of mirrors at a rate of between 24 to 60 or more frames of video per second, with corresponding synched audio.

Holographic displays generated over the last 20-year period utilize various configurations including lasers with images on glass plates such as an AGFA 8E75HD glass plate or other glass plates as well a laser such as a Spectra Physics 124B HeNe laser, a 35 mW laser diode system utilizing different processing methods such as pyrochrome processing. Split beam techniques can also use Multi H1 to Multi H2. Such configurations as 8×10, triethanolomine, from Linotronic 300 image setter film are also commonly utilized or a configuration with rear-illuminated for 30×40 cm reflection hologram, where a logo floats 18-inches in front of the plate.

SUMMARY OF THE INVENTION

Some user interfaces have adopted a multi-dimensional interface approach. For example, the "heliodisplay" of IO2 Technology, LLC of San Francisco, Calif. projects images into a volume of free space, i.e., into an aerosol mixture such as fog or a gas, and may operate as floating touchscreen when connected to a PC by a USB cable. However, with the heliodisplay, the image is displayed into two-dimensional space (i.e., planar). While the Heliodisplay images appear 3-dimensional ("3-D"), the images are planar and have no physical depth reference.

Unfortunately, these existing uses have certain limitations in distribution and deployment. For example, functionally, the heliodisplay is a two-dimensional display that projects against a curtain of air, or even glass. While the heliodisplay may give the appearance of 3-D, the images displayed and the interface are 2-D. As such, the heliodisplay is not a true 3-D holographic display, and thus the interface operates on a two-dimensional plane, not taking advantage of a full three-dimensional coordinate system.

Accordingly, there is a need for an integrated User Interface that utilizes true 3-D technology to create a computing and multimedia environment where a user can easily navigate by touch, mouse or pointer system to effectively navigate the interface to raise the level of the user experience to a true 3-D environment, with the goal of attaining elements of the attenuated clarity, realism and benefits of that environment that match our day-to-day conventional interactions with the 3-D world. The present invention relates to the creation of a holographic user interface display system that combines physical media or digitally stored files with a digital holographic player hardware system. The result is the creation of a multimedia holographic user interface and viewing experience, where a variety of graphical schematics enabling cohesive access to information utilizing pyramids, blocks, spheres, cylinders, other graphical representations, existing templates, specific object rendering, free form association, user delegated images and quantum representations of information to form a user interface where the available tools combine over time to match a user's evolving data and requests.

In one example embodiment of the invention, a system and corresponding method for providing a 3-D user interface involves displaying images in a 3-D coordinate system. Sensors are configured to sense user interaction within the 3-D coordinate system, so that a processor may receive user interaction information from the sensors. The sensors are able to provide information to the processor that enables the processor to correlate user interaction with images in the 3-D coordinate system. The images in the 3-D coordinate system are a holographic keyboard that is made in consideration of the limitations as discussed above.

An embodiment of the present invention relates to a system for a 3-dimensional (3-D) user interface with priority information. The system includes holographic images having a data input field. The data input field receives user data input information. A comparator system compares the user data input information to frequently used terms in a database and to generate priority information based on the comparison. A 3-dimensional (3-D) projector generates and displays the holographic images including the priority information in a 3-D coordinate system. A plurality of sensors senses user interaction of the holographic images of priority information within the 3-D coordinate system. A processor receives user interaction information including the selected priority information from the plurality of sensors, and correlates the user interaction with the holographic images of priority information in the 3-D coordinate system.

In yet another embodiment of the invention provides a holographic user interface which transforms the computing environment to enable a three-dimensional holographic style user interface and display system. The system utilizes holographic projection technology along with programmed quadrant matrixes sensor field to create multiple methods to select and interact with data and user interface tools and icons presented in a holographic format. The system may be used for interconnecting or communicating between two or more components connected to an interconnection medium (e.g., a bus) within a single computer or digital data processing system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the invention.

DETAILED DESCRIPTION OF THE INVENTION

A description of example embodiments of the invention follows.

The present invention, in accordance with one embodiment relates to the creation of a holographic user interface which transforms the computing environment to enable a three-dimensional (3-D) holographic style user interface and display system. The system utilizes holographic projection technology along with programmed quadrant matrixes sensor field to create multiple methods to select and interact with data and user interface tools and icons presented in a holographic format.

In accordance with another embodiment of the present invention, there are provided methods and apparatus for implementing an interface with priority information. The priority of information is displayed as part of the holographic images. As a user is inputting data into a data input field, a list of priority information is offered to the user to choose from such that any arbitrary data input field can be associated during build time (i.e., at the time the holographic image is created) with any frequently used terms. As the term is employed herein, frequently used terms may be any data source containing a collection of members, with individual members being potential candidates for the list of priority information. The data source does not necessarily have to be historical data and, in some cases, may not even contain entries previously made by the user. As the user enters one or more characters into the data input field, a list of user-selectable candidate matches is created as the priority information. The list of priority information is refreshed either continually or from time-to-time to take into account any newly entered data. At some point, the user may pick from one of the user-selectable candidates that matches is presented instead of continuing to enter data. Once one of the user-selectable priority information is chosen, the user's entry assumes the value of the chosen match. That is, the selected candidate match is assigned to the variable associated with the data input field, thereby achieving auto-completion of the user data input. By way of example, the frequently used data may be a compilation of data from, for example, documents in Microsoft Word or other word processing software.

Figure 1:
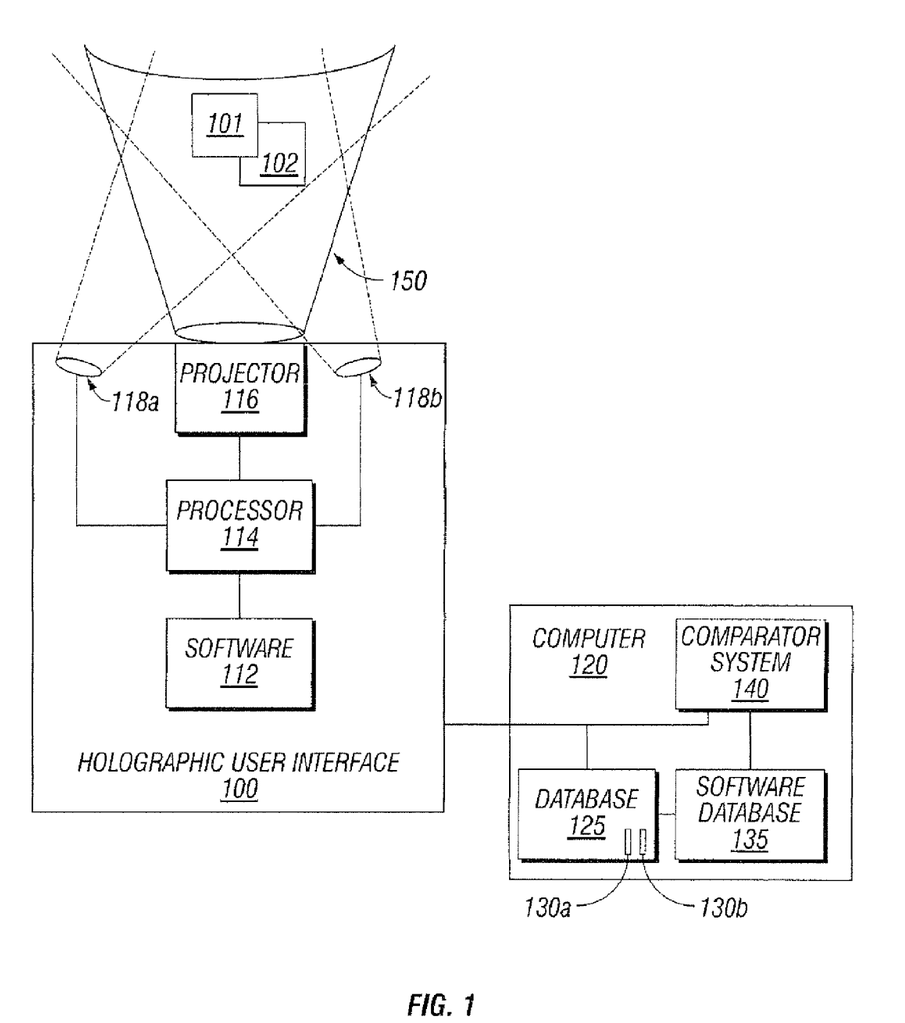
FIG. 1 is a block diagram illustrating a holographic user interface according to an example embodiment of the present invention.

FIG. 1 illustrates a holographic user interface 100 according to one example embodiment of the present invention. The holographic user interface 100 includes a processor 114 that operates software 112, controls a holographic image projector 116, and processes information obtained from sensors 118a, 118b. The processor 114 receives user interaction information from the sensors 118a, 118b in response to the sensors 118a, 118b being activated upon interception of a path of the sensors 118a, 118b.

The projector 116 may generate and display in a 3-D display image 101, 102 within a 3-D coordinate system 150 in response to a user's desired selection. The displayed image 101, 102 may be one type of holographic keyboard 605 (FIG. 6) amongst a plurality of holographic keyboards. The sensors 118a and 118b may be directed toward the 3-D coordinate system to sense user interaction with images (e.g., holographic keyboard 605) within the 3-D coordinate system. If a user were to interact with an image 101 or 102, the sensors 118a and 118b would provide coordinate information that the processor can correlate with the projected images 101 and 102 in the 3-D coordinate system. The interface 100 may communicate with a computer 120 to process and retrieve/store holograms 130a, 130b (collectively 130) in database 125. The database 125 may also store the frequently used terms. The computer 120 may also include a software database to communicate with the processor 114 to provide logic for the sensors 118a and 118b to sense the user interaction and retrieve the displayed holographic keyboard.

Moreover, the computer 120 may also include a comparator system 140. The comparator system 140 compares the user data input information to the frequently used terms stored in the database 125. The comparator system 140 then generates priority information based on the comparison. The priority information is information that appears in the holographic images in the 3-D coordinate system. The computer 120 may be a separate standalone unit or be integrated with the interface 100.

The 3-D projector and interface 100 are capable of displaying the holographic priority information on a variety of surfaces. The surface may be flat, contour, non-flat, or any combination thereof type of surfaces. The system relating holographic human machine interfaces between humans and electronic or electro-mechanical equipment is described in greater detail in U.S. Pat. No. 6,377,238 entitled, "Holographic Control Arrangement," which is hereby incorporated by reference in its entirety. Another system that relates to holographic human machine interfaces is U.S. Pat. No. 7,054,045 entitled, "Holographic Human-Machine Interfaces," which is hereby incorporated by reference in its entirety. Moreover, the interface 100 may project the holographic priority information in thin air rather than on a surface.

Figure 6:
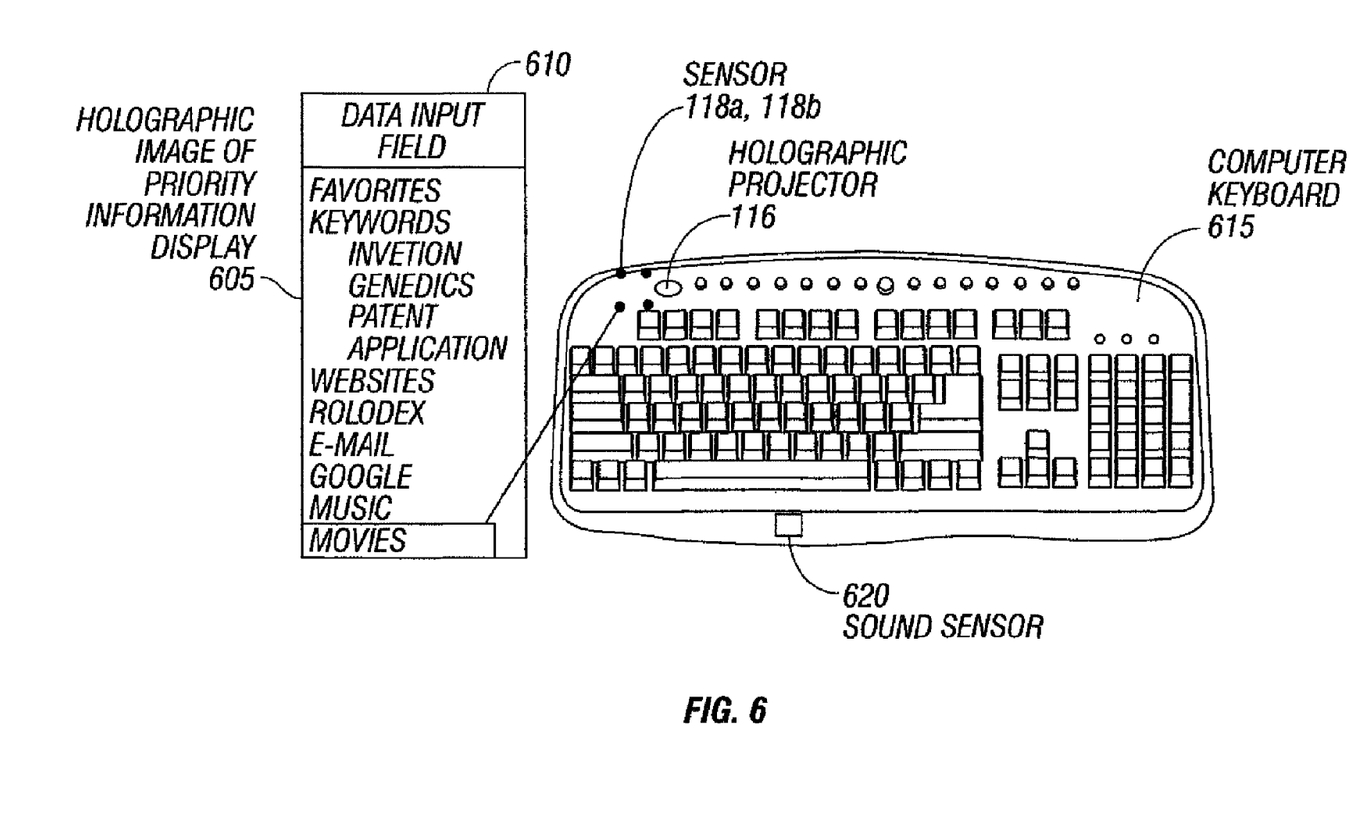
FIG. 6 is a block diagram illustrating a keyboard displaying a list of priority data information according to an example embodiment of the present invention.

The database 125 may store the plurality of holograms 130 having a variety of different types of keyboards 605. The database 125 may communicate with the 3-D projector 116 via the interface 100 to generate and display the one type of keyboard 605.

Figure 2:
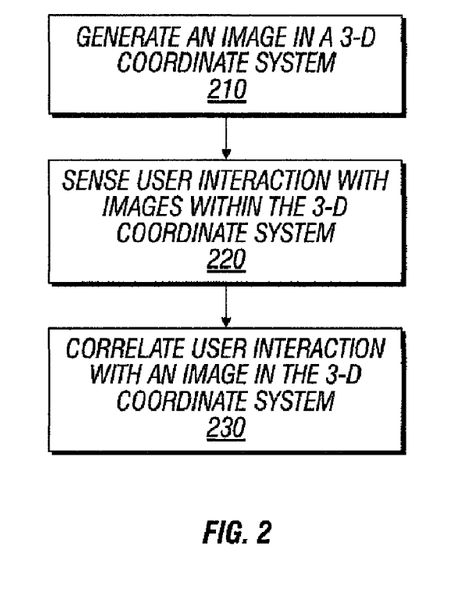
FIG. 2 is a flow chart diagram illustrating a method for providing a 3-dimensional (3-D) interface with a system according to an example embodiment of the present invention.

FIG. 2 is a flow chart that illustrates the method for providing a 3-dimensional (3-D) interface with a system. The interface generates (210) an image in a 3-D coordinate system. In operation, an embodiment of the interface deploys holographic information in the form of a user interface template as a default once turned on. Sensors on the interface sense (220) a user's interaction with the 3-D coordinate system. The sensing may occur through the use of matrixes or triangulated data points that correspond to specific functions and data display which the system is capable of displaying. The interface may then correlate (230) the user's interaction with an image in the 3-D coordinate system. By sensing and correlating interaction with the 3-D coordinate system, the interface allows a computer system or display to interact with a user. The holographic data displayed by the system becomes a result of a selection process by the user who triggers data being displayed by key strokes or by the use of a three-dimensional interactive interface. A user's location commands are read by the system at their exact points and then the system deploys the appropriate response or holographic media based upon the user's specific request made via the location of that request.

Figure 3:
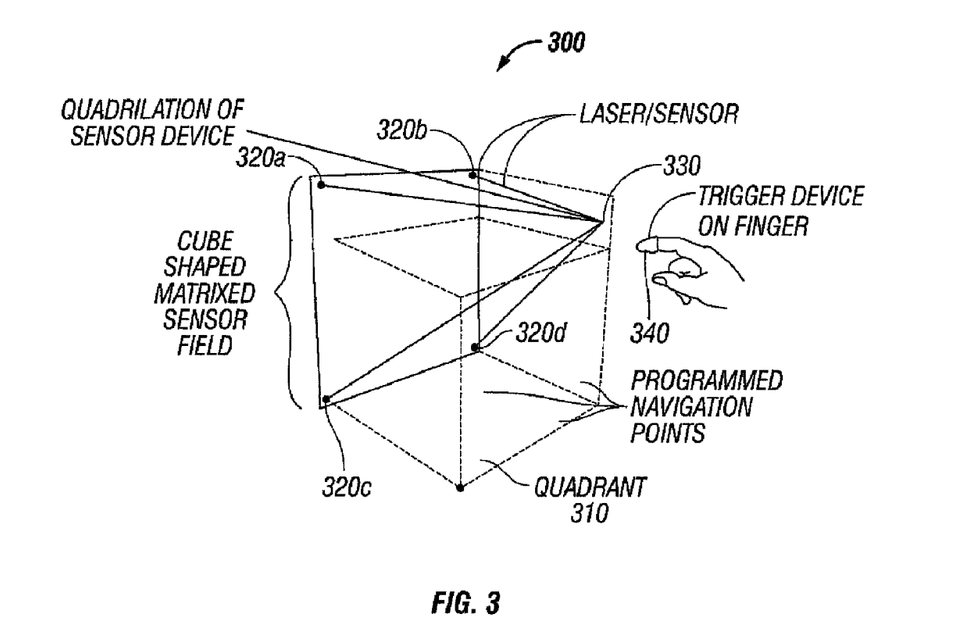
FIG. 3 is a perspective view of sensor field used in connection according to an example embodiment of the present invention.

FIG. 3 illustrates a sensor field used in connection with embodiments of the present invention. The embodiment illustrated in FIG. 3 includes four laser sensors 320a-d. The manipulatable interface may be a relatable and interactive holographic media via the use of a sprocketed sensor system which deploys from the display either via a built in or retrofit hardware peripheral that creates a quadrilateral angle navigation system to determine the exact point 330 of a fingertip touch point 340 within a quadrant 310 (also referred to as a "3-D coordinate system"). This touch point, if effectively deployed by the user, is mapped to the image deployed by the holographic hardware and software system, as each image that is displayed in the system is displayed from an exacting point at an exacting place in space that has been preconfigured to match specific points on the quadrilateral sensor system. The points in space attached to programmed images are then matched to touch points made by the user. The touch point may trigger the same functions as a mouse and cursor. The sensors 118a, 118b may be activated upon the interception of the path by a user placing a finger (e.g., 340) through a key of the holographic keyboard 605.

One skilled in the art will recognize that other sensing configurations or devices may be used to sense a location within a 3-D coordinate system. For example, the sensors may be laser sensors configured to provide data to triangulate a point within the 3-D coordinate system, photo voltaic sensors, photo electric light sensors, or image sensors. The sensors may be programmed to identify the specific location of the touchpoint 330 that may extend through multiple planar images, to identify a single image located at a 3-D coordinate space.

Figure 4:
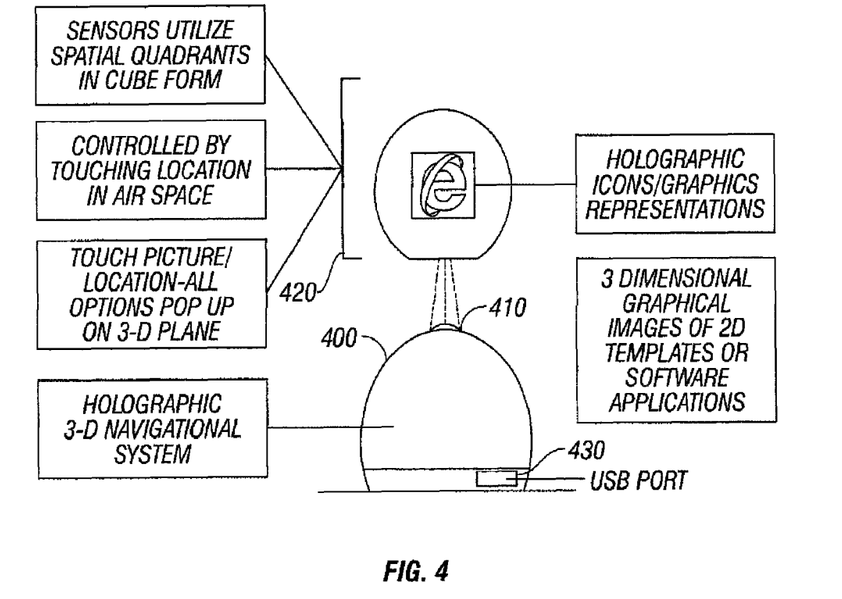
FIG. 4 is a front view of a holographic user interface device according to one example embodiment of the present invention.

FIG. 4 illustrates a holographic user interface device 400 according to one embodiment of the present invention. The device 400 has a port 410 that may provide the output projector for the multi-dimensional display, and also the sensors for detecting user interaction. The projector and sensors map out a 3-D coordinate system 420 to serve as the holographic user interface. A communications port 430, such as a universal serial bus ("USB") port or wireless connection, serves to allow the device 400 to communicate with a computer system. The holographic system may be based upon our prior holographic system technology filing where the User Interface icons and documents may be saved to a fixed media form and activated by commands sent from the operating system to the device managing the index on the holographic fixed media system and display. Similarly, any system that utilizes holographic displays may also be manipulated and selected using the sensor interface system.

Figure 5:
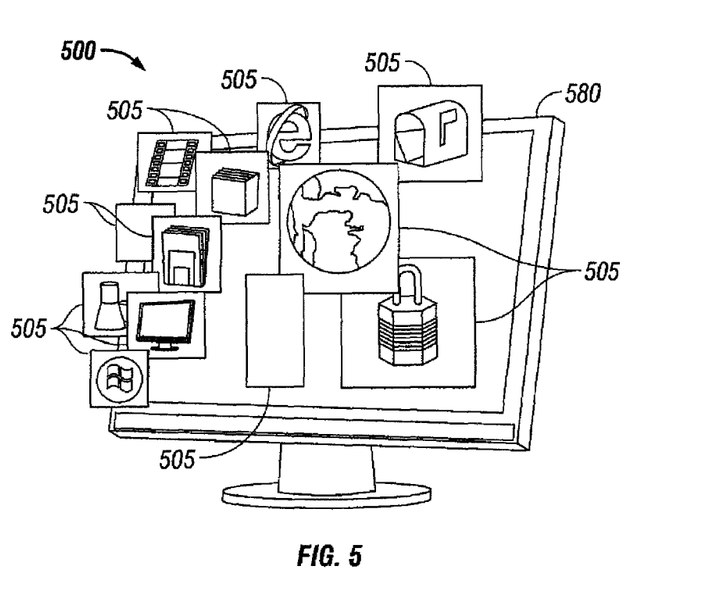
FIG. 5 is a perspective view of a diagram of a holographic user interface according to another example embodiment of the present invention.

FIG. 5 is a perspective view of a diagram of a holographic user interface 500 according to another embodiment of the present invention. The holographic user interface device may operate with a projection screen 580. Images 505 displayed by the projection screen 580 of the user interface 500 can include shapes, graphic images, animation sequences, documents, audiovisual programs, a logical display based upon the user's patterns of use with the system (such as always going online first, always working on a word document second and always viewing pictures or videos from the user's hard drive. Third, these icons could be presented to the user in an order of priority on the display representing the user's evolving use habits based upon history, including distinct changes based upon day, time and date), traditional UI operating system icons, such as Word document icons and portable document format ("PDF") icons may be presented in a holographic format. Documents may be revised and read through in a traditional manner or documents, or any displayed item may revert back to the flat display monitor based upon user command.

FIG. 6 is a block diagram illustrating a keyboard 615 displaying holographic images according to an example embodiment of the present invention. The holographic images having a data input field 610 for the user to type in the user data input information. As the user is typing in the user data input information, a holographic image displaying the priority information 605 is generated and projected within the 3-D coordinate system.

A comparator system 140 compares the user data input information to frequently used terms in a database 125 and to generate the priority information 605 based on the comparison. The comparator 140 may track the frequently used terms based on historical data entries by the user of the interface. The priority information 605 may be a list of candidate's matches. Furthermore, the list of candidate's matches may include a list of categories. The list of categories may be favorite links, keywords, websites, rolodex, electronic mail, music, movies, or any combination thereof. For example, if a user types in "bo", the priority information 605 may be displayed including the categories for website and rolodex. Under the website and rolodex categories may be "boston.com" and "bob smith", respectively. The user may choose to select "boston.com" or "bob smith."

Moreover, the categories of the priority information 605 may be setup by the user. For example, the user may want only e-mail addresses and music. As such, only user-selectable candidate's priority information is displayed to the user to choose from. Additionally, the comparator system 140 may use data analyzing techniques including sort and parse features to associate the user data input information to a list of priority information 605.

The interface 100 may communicate with a computer 120 for data exchange, in particular the retrieval of the frequently used terms stored in the database 125. The priority information 605 may then be displayed by the interface 100. The interface 100 may alter the size and shape of the priority information 605 in accordance to a user's desire.

Figure 7:
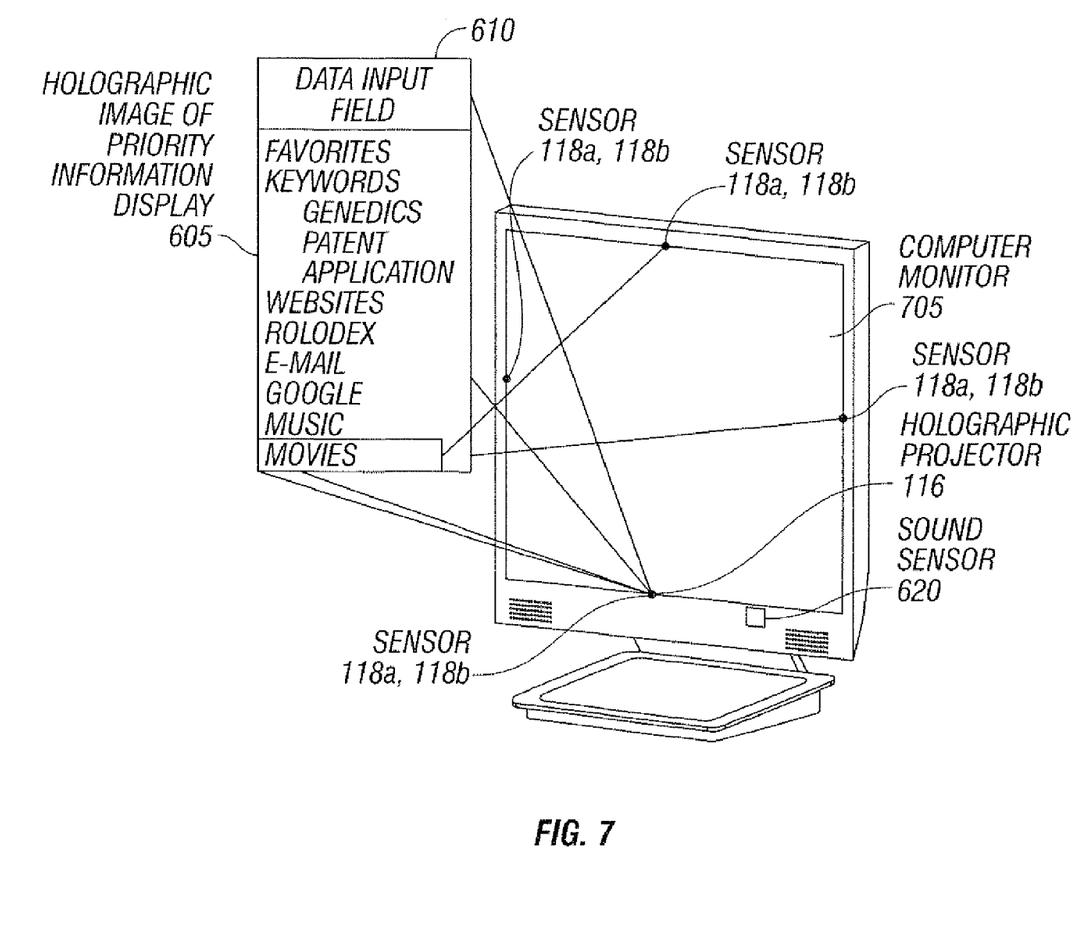
FIG. 7 is a block diagram illustrating a monitor user interface displaying a list of priority data information according to an example embodiment of the present invention.

FIG. 7 is a block diagram illustrating a monitor 705 user interface displaying a list of priority data information 605 according to another example embodiment of the present invention. FIG. 7 is similar to FIG. 6, but is a computer monitor 705 rather than a keyboard 605. The interface 100 may be integrated into the monitor 705 to project priority information 605.

Figure 8:
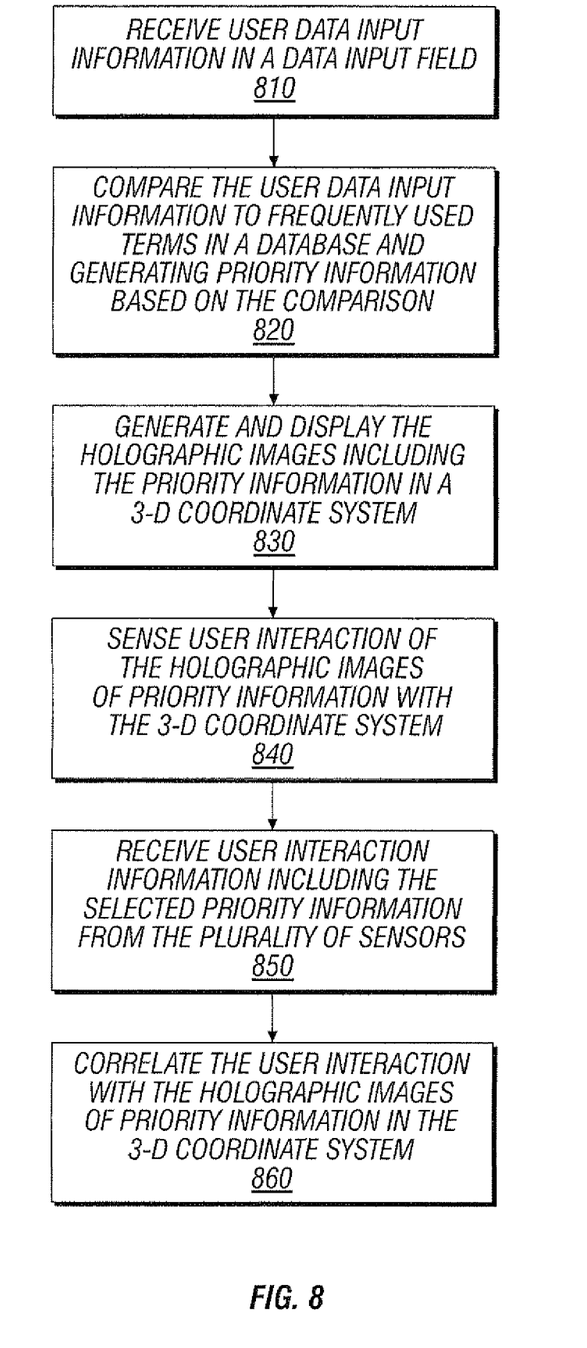
FIG. 8 is a flow chart diagram illustrating a method for providing a 3-dimensional (3-D) interface with priority data information according to an example embodiment of the present invention.

FIG. 8 is a flow chart diagram illustrating a method for providing a 3-dimensional (3-D) interface with a system to display priority information. The interface receives user data input information in a data input field (810). The interface then compares the user data input information to frequently used terms in a database and generates priority information based on the comparison (820). The interface generates and displays the holographic images including the priority information in a 3-D coordinate system (830).

Sensors on the interface sense user interaction within the holographic images of priority information within the 3-D coordinate system (840). The sensing may occur through the use of matrixes or triangulated data points that correspond to specific functions and data displays which the system is capable of displaying. The interface may then correlate the user's interaction with the keyboard in the 3-D coordinate system.

The interface receives user interaction information in response to a plurality of sensors being activated upon interception of a path of the plurality of sensors (840). There are many ways in which the plurality of sensors can be activated. For example, a Light Amplification by Stimulated Emission of Radiation (LASER) may intercept or break the path of the plurality of sensors. In another example, the holographic interface may include a holographic mouse in addition to the holographic keyboard. In such a situation, the holographic mouse may activate the plurality of sensors by clicking on a button on the mouse. The holographic mouse is further explained in detail in U.S. patent application Ser. No. 11/932, 792 entitled, "Method and Apparatus for User Interface of Input Devices" by Gene S. Fein and Edward Merritt, which is hereby incorporated by reference in its entirety. In yet another example, the interface may include a sound sensor 620 to receive a user's voice to activate the chosen word from the list of priority information by the user. By sensing and correlating interaction with the 3-D coordinate system, the interface allows a computer system or display to interact with a user. The holographic data displayed by the system becomes a result of a selection process by the user who triggers data being displayed by the priority information or by the use of a three-dimensional interactive interface. A user's location commands are read by the system at their exact points and then the system deploys the appropriate response or holographic media based upon the user's specific request made via the location of that request. The interface may receive user interaction information including the selected priority information from the plurality of sensors (850). The interface correlates the user interaction with the holographic images of priority information in the 3-D coordinate system (860).

Those of ordinary skill in the art should recognize that methods involved in providing a 3-D user interface with a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIGS. 1, 2, 6, 7, 8 or other embodiments.

While this invention has been particularly shown and described with reference to example embodiments thereof, it will be understood by those skilled in the art that various changes in form and details may be made therein without departing from the scope of the invention encompassed by the appended claims.

What is claimed is:

1. A system for a 3 dimensional (3-D) user interface with priority information, the system comprising:
    a 3-D projector to generate and display holographic images having a data input field to receive user data input information;
    a comparator system configured to compare the user data input information to frequently used terms in a database and to generate priority information based on the comparison;
    wherein the 3-D projector is configured to generate and display the holographic images including a holographic image of the priority information in a 3-D coordinate system;
    a plurality of sensors configured to sense, based on quadrilateral angle navigation to determine a touch point position within the 3-D coordinate system, user interaction with the holographic image of the priority information in the 3-D coordinate system; and
    a processor configured to receive user interaction information from the plurality of sensors, and to correlate the received user interaction information with the holographic image of the priority information in the 3-D coordinate system,
    wherein the priority information includes data other than historical data associated with user entries.

2. The system of claim 1 wherein the priority information further includes historical data entries, and wherein the comparator system is further configured to track the frequently used terms based on the historical data entries, which are provided through user interface.

3. The system of claim 1 wherein the priority information includes a list of candidate matches.

4. The system of claim 3 wherein the list of candidate matches includes a list of categories, the list of categories including favorite links, keywords, websites, rolodex, electronic mail, music, movies, or any combination thereof.

5. The system of claim 4 wherein the categories are user-configured.

6. The system of claim 1 wherein the comparator system is configured to use data analysis techniques including sort and parse features.

7. The system of claim 1 wherein the processor is further configured to provide an indication, responsive to the correlation of the received user interaction information with the holographic image of the priority information, in the 3-D coordinate system.

8. The system of claim 7 wherein the provided indication includes a change in the displayed holographic images in the 3-D coordinate system.

9. The system of claim 1, further comprising a communications port coupled to the processor and configured to provide a communications interface with a computer system.

10. The system of claim 1 wherein the plurality of sensors includes photo voltaic sensors.

11. The system of claim 1 wherein the plurality of sensors includes image sensors.

12. The system of claim 1 wherein the plurality of sensors includes photo electric light sensors.

13. The system of claim 1 wherein the plurality of sensors includes laser sensors.

14. A method for providing a 3-dimensional (3-D) interface with priority information, the method comprising:
    receiving user data input information in a data input field;
    comparing the user data input information to frequently used terms in a database and generating priority information based on the comparison;
    generating and displaying holographic images including a holographic image of the priority information in a 3-D coordinate system;
    sensing, from a plurality of sensors, user interaction with the holographic image of the priority information in the 3-D coordinate system;
    wherein said sensing the user interaction includes using said plurality of sensors to determine, based on quadrilateral angle navigation, a touch point position within the 3-D coordinate system that selects a candidate match from the displayed holographic image of the priority information;

receiving, from the plurality of sensors, user interaction information; and correlating the received user interaction information with the holographic image of the priority information in the 3-D coordinate system.

15. The method of claim 14, further comprising tracking the frequently used terms based on historical data entries provided through user interface.

16. The method of claim 14 wherein said generating the holographic image of the priority information includes generating a list of candidate matches.

17. The method of claim 14 wherein said comparing includes utilizing data analysis techniques including sort and parse features.

18. The method of claim 14 wherein the priority information does not include and is not based on historical data associated with user entries.

19. The method of claim 14 comprising generating an indication to the correlation of the received user interaction information with the holographic image of the priority information, in the 3-D coordinate system.

20. The method of claim 19 wherein the generated indication includes a change in the displayed holographic images in the 3-D coordinate system.

21. The method of claim 19, further comprising providing the generated indication to a device on a network.

22. The method of claim 14 wherein said sensing includes using laser sensors to geometrically identify a position within the 3-D coordinate system.

23. The method of claim 22 wherein said using laser sensors to geometrically identify includes using laser sensors to triangulate a position within the 3-D coordinate system.

24. The method of claim 22 wherein said using laser sensors to geometrically identify includes using laser sensors to quadrilate a position within the 3-D coordinate system.

25. An article of manufacture, comprising:

a non-transitory computer readable medium having computer readable program codes embodied therein to cause a computer to generate a 3-dimensional (3-D) holographic user interface with priority information, the computer readable medium program codes being executable by the computer to:

compare user data input information, received in a holographic data input field to frequently used terms in a database and generate priority information based on the comparison;

generate and display holographic images including a holographic image of the priority information in a 3-D coordinate system;

correlate user interaction information, received from a plurality of sensors that sense user interaction with the holographic image of the priority information in the 3-D coordinate system, with the holographic image of the priority information in the 3-D coordinate system;

wherein the user interaction information received from the plurality of sensors includes a determination, based on quadrilateral angle navigation, of a touch point position within the 3-D coordinate system that selects a candidate match from the displayed holographic image of the priority information.

26. The article of manufacture of claim 25 wherein the priority information does not include and is not based on historical data associated with user entries.

* * * * *

UNITED STATES PATENT AND TRADEMARK OFFICE
CERTIFICATE OF CORRECTION

| | | |
|---|---|---|
| PATENT NO. | : 8,127,251 B2 | Page 1 of 1 |
| APPLICATION NO. | : 11/932372 | |
| DATED | : February 28, 2012 | |
| INVENTOR(S) | : Fein et al. | |

It is certified that error appears in the above-identified patent and that said Letters Patent is hereby corrected as shown below:

Column 9, line 59, in Claim 1, delete "3 dimensional" and insert -- 3-dimensional --.

Column 10, line 22, in Claim 2, delete "through user" and insert -- through the user --.

Column 11, line 11, in Claim 15, delete "through user" and insert -- through the user --.

Column 11, lines 20-21, in Claim 19, delete "claim 14 comprising generating an indication to the" and insert -- claim 14, further comprising generating an indication, responsive to the --.

Signed and Sealed this
Twenty-eighth Day of August, 2012

David J. Kappos
*Director of the United States Patent and Trademark Office*